J. R. MOFFITT.
Apparatus for Molding Rubber.
No. 51,207. Patented Nov. 28, 1865.
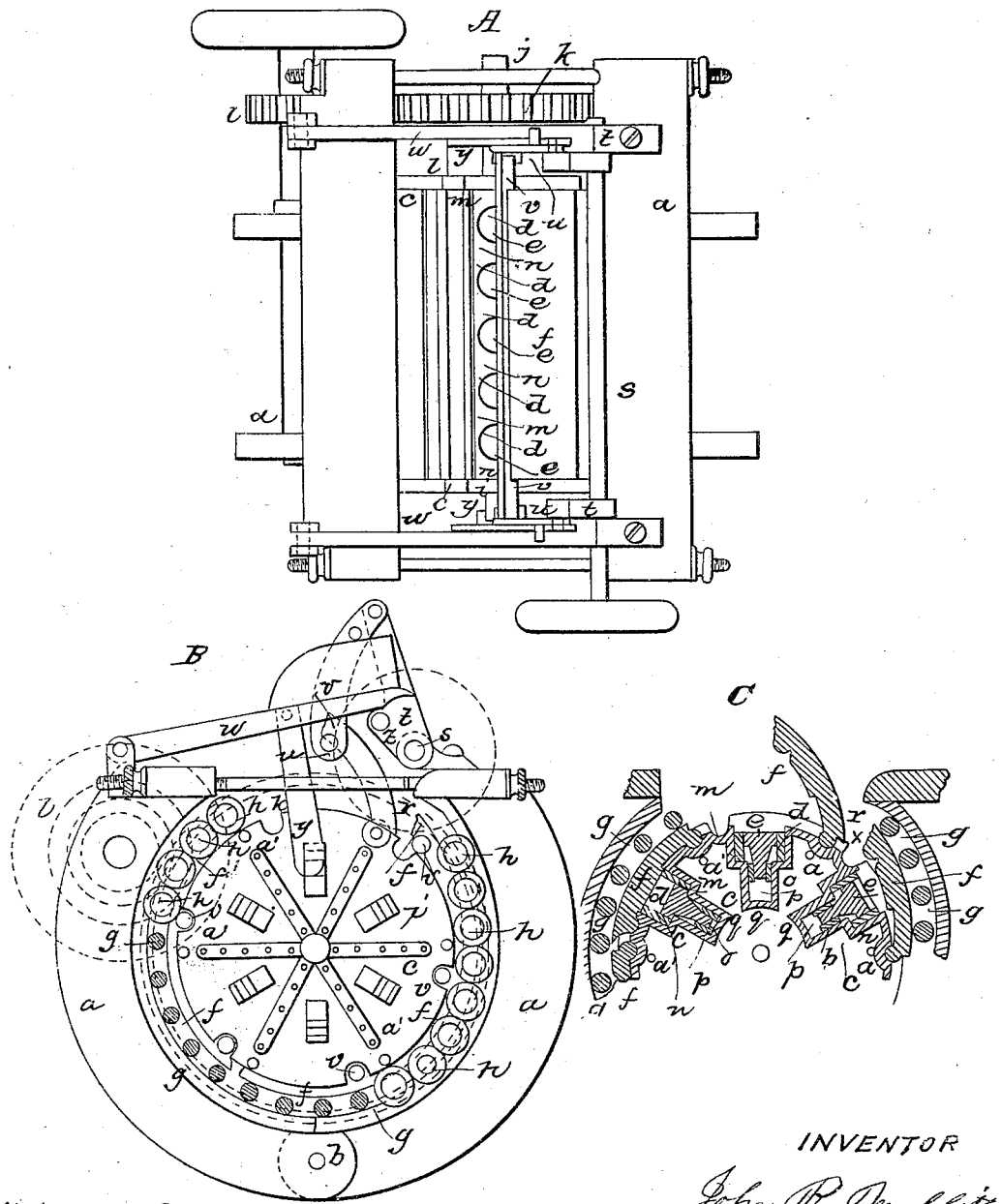
WITNESSES
F. Gould
W. B. Gleason
INVENTOR
John R. Moffitt
by his Atty
W. B. Crosby

UNITED STATES PATENT OFFICE.

J. R. MOFFITT, OF CHELSEA, MASSACHUSETTS.

IMPROVEMENT IN APPARATUS FOR MOLDING RUBBER.

Specification forming part of Letters Patent No. 51,207, dated November 28, 1865.

*To all whom it may concern:*

Be it known that I, J. R. MOFFITT, of Chelsea, in the county of Suffolk and State of Massachusetts, have invented an Improved Apparatus for Molding Rubber Vulcanite; and I do hereby declare that the following, taken in connection with the drawing which accompanies and forms part of this specification, is a description of my invention sufficient to enable those skilled in the art to practice it.

My invention relates to the construction of mechanism for manufacturing articles of vulcanized rubber by the combined processes of heat and pressure.

The invention consists in an arrangement of a cylindrical or endless series of molds around, and so as to rotate with, a steam-cylinder or heater, and in the manner of producing pressure upon the material being molded; also, in the arrangement of mechanism by which the molded articles are discharged from the press.

The drawing represents the mechanism embodying my invention, A showing a plan, and B an end view, thereof. C is a cross-section, showing the construction of the steam-cylinder.

$a$ denotes a stationary frame, made in two parts hinged together, as seen at $b$, and connected at top by screw-rods and nuts, as shown in the drawing. These two parts, so hinged and connected, form a press, the inner or bearing surfaces of which serve to support a rotary steam-cylinder, $c$, carrying in its outer surface a series of molds, $d$, in connection with which plungers or dies $e$ and platens $f$ operate to produce pressure upon the material being molded.

The operating-faces of the press are nearly cylindric, only slightly departing therefrom to regulate the degree of pressure upon the platens by the screw-rods and nuts. The cylinder $c$ is supported concentrically in this press, in which it rotates, by means of a series of friction-rolls, $g$, extending the length of the cylinder and rolling against the adjacent surfaces of the press $a$ and the platens $f$. The rolls are kept from endwise movement by guide-rolls $h$ at the opposite ends of each friction-roll, these rolls $h$ running upon the peripheries of the cylinder-heads $i$ and guiding against the ends of the platens $f$, and serving to keep the friction-rolls at suitable distance apart by their contact with each other, as shown at B.

Rotation is imparted to the cylinder and its molding mechanism by gears $k$ $l$ driven by hand, or in any other suitable manner. This cylinder is a long hollow shell made up of a series of mold-boxes, $m$, each of which carries one of the series of mold-blocks, $n$, fitting into it, as seen at C, and each mold-block $n$ has a series of molds, $d$, as seen at A. Steam is admitted to the interior of the shell through a steam pipe, $j$, imparting heat to the whole surface of the shell, and communicating the same to the molds $d$, as will be readily understood.

Each mold has a plunger, $e$, the upper surface of which, in connection with the mold, forms the bottom and sides of the die for shaping the material in the mold. Each plunger is made capable of movement in the mold, having a tail-piece, $o$, fitting into a carrier, $p$, each of which carries one series of plungers, this carrier sliding radially in the shell, or in a long guide-chamber, $q$, formed therein, as seen at C. The plungers rest upon these carriers, and are raised at the proper time by them to force the rubber, when pressed into shape, from the molds.

Each series of molds is covered by a platen, $f$, hinged or jointed at one edge to the cylinder-head $i$, and so that it may be turned up from the mold, as seen at C. The inner surface of the platen is made of such form, or has a piece affixed to it of such form, as to shut down over and close against the upper surface of the molds.

The press $a$ has an open space at top, into which each platen is raised, as in the rotation of the cylinder it comes under such space, as seen at B. The friction-rolls do not extend entirely around the series of platens, but are of such number as to leave a space equal at least to the width of one platen. As in the rotation of the cylinder the platen comes under the mouth of the press, the friction-rolls run over the top surface of the platens and drop into the groove or space between the platen and press on the opposite side of the mouth, thus bringing each set of molds, as soon as it passes the mouth, under the action of the press.

When the platen or cover is raised, as seen at C, and the molds beneath are charged with rubber the rubber will project from the mouths of the molds. This will prevent the platens from shutting closely down against the molds, or will leave the platen somewhat as seen at $x$ in C. The curved surface of the press is therefore made eccentric where the friction-rolls enter it, leaving a flaring entrance, as seen at $r$, so that the rubber is gradually pressed into the molds as the platen passes this eccentric-surface to the cylindric surface beyond, after which the platen fits closely against the face of the mold-block, where it is kept by the press until it emerges at the mouth of the press. The time of rotation of the cylinder and the degree of heat imparted to it are so regulated that as each plate comes under the mouth of the press the vulcanized rubber has become molded into form and set. Upon lifting the platen the articles (raised from the molds by the plungers beneath) may be immediately removed and the molds recharged.

Each platen is raised and the series of plungers in the molds beneath caused to press the molded articles from the dies, as follows: A rocker-shaft, $s$, carries at each end an arm, $t$, from which is hung a hook, $u$, which, by turning the shaft $s$, is made to hook into a pin, $v$, projecting from each end of each platen. Other arms, $w$, are hinged to the opposite side of the press, each of which carries a hook, $y$, which, by raising the arm at the proper time, hooks into the opposite end of each plunger-carrier as they come under the mouth of the press, these ends projecting through the cylinder-heads, and sliding radially in oblong slots made through said heads. The arms $w$ are raised by pins $z$ projecting from the arms $t$, and the shaft $s$ is turned by a hand-wheel, to operate the hooks as each platen in succession comes under he mouth of the press.

Pipes $a'$ lead from the outer part of each compartment formed in the shell, as seen at C, so that any water condensed from the steam may be forced from the cylinder, when it settles, by gravity, in the bottom of the compartment, as in its rotation it is brought to its lowest position.

It will be obvious that by this construction of the press and its continuous system of molding mechanism the process of molding by heat and pressure can be practiced with great ease and expedition, the whole series, excepting the one being cleared and recharged, simultaneously undergoing the heating and pressing operation.

I claim—

1. In a molding-press, the combination of a rotary series of molds, a rotary steam-cylinder and a pressure mechanism, arranged and operating together for the purpose substantially as set forth.

2. The method of effecting the pressure in the molds by the rotary platens, operated upon by the friction-rolls, substantially as set forth.

3. The method of adjusting the degree of pressure upon the platens by hinging the two parts of the press together and regulating the distance between the same by the screw-rods and nuts, substantially as described.

4. The mechanism for lifting the platens and plungers, operating substantially as set forth.

5. The eccentric construction of the surface of the press where the platens enter the same, by which each platen is gradually closed upon its molds, substantially as described.

In witness whereof I have hereunto set my hand this 12th day of August, A. D. 1865.

J. R. MOFFITT.

Witnesses:
F. GOULD,
W. B. GLEASON.